July 7, 1970  C. W. BIMBA  3,518,920
FLUID POWER MOTOR WITH NON-ROTATING PISTON ROD
Filed July 17, 1968
Figure 1
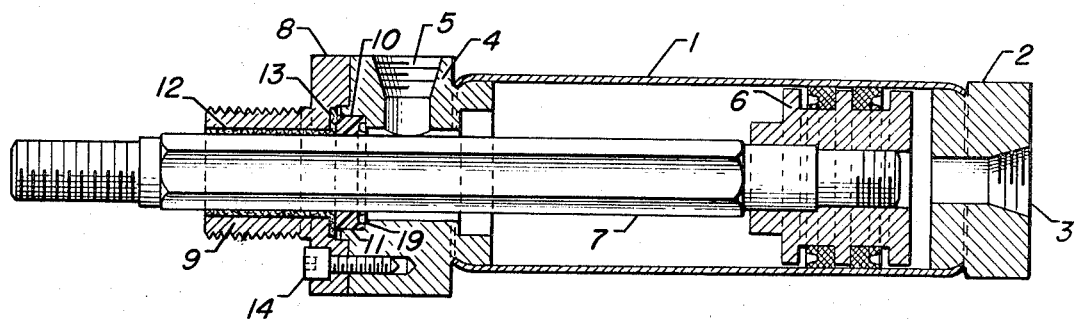
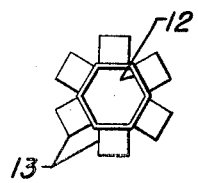
Figure 3
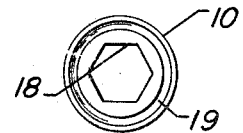
Figure 2
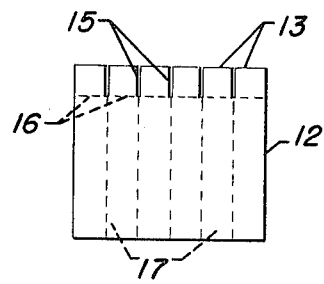
Figure 4
INVENTOR:
Charles W. Bimba
BY:
Philip T. Liggett
ATTORNEY

3,518,920
FLUID POWER MOTOR WITH NON-ROTATING PISTON ROD

Charles W. Bimba, Crete, Ill.
(101 Main St., Monee, Ill. 60449)
Filed July 17, 1968, Ser. No. 745,573
Int. Cl. F16j 15/18, 9/08
U.S. Cl. 92—168                                                   1 Claim

ABSTRACT OF THE DISCLOSURE

A fluid power cylinder assembly using a polygonal-shaped piston rod so as to preclude rotation of the rod during operation. Improved seal means around the rod comprises a combination of an inner seal ring of polyurethane which is impregnated with molybdenum disulfide, and a long sleeve-type liner which is formed from a flat sheet of fiber filled Teflon. The latter is cut and bent at one end so that resulting sections form means equivalent to a flange that can be clamped between sections of an end closure for the one end of the cylinder housing and thereby hold the liner in a locked position.

---

The present invention relates to an improved form of fluid power unit, such as an air cylinder, so as to provide a non-rotating type of piston rod. More specifically, the invention is directed to a simplified, but very efficient, type of seal means which permits the use of an inexpensive and unpolished cold drawn steel piston rod which is square, hexagonal, or other polygonal shape.

In connection with air cylinders or other related forms of fluid power motors, there is frequently the need to have a non-rotating piston rod construction so as to preclude the use of guide means on the "work-end" of the piston rod. In other words, unless some means is built within the cylinder unit to prevent the turning of the piston rod then the external end of the piston rod must be provided with a suitable guide means to maintain alignment for the rod connection to the "work" being reciprocated by the motor unit. One common form of guide means is accomplished by mounting a projecting member on the exterior portion of the piston rod and then externally maintaining this member in-between fixed-position guide means. Since this external guide arrangement is a nuisance and can be costly, there is a demand by cylinder users to obtain cylinders with non-rotating type piston rods.

With the "single acting" cylinder, where the air or other fluid pressure is applied to merely the one end of the cylinder, i.e., against the blind end of the piston, there is no real problem of fluid leakage around the sides of the piston rod as it moves in and out of the end of the cylinder housing opposite the fluid inlet end. On the other hand, with the "double-acting" cylinder, where fluid pressure is applied to the interior of the cylinder from both ends of the unit and thus to each side of the piston, then there is the mechanical problem of effecting a good pressure tight seal around the piston rod.

Thus, it may be considered a principal object of the present invention to provide improved and inexpensive seal means for use with a polygonal piston rod in a double-acting cylinder assembly.

It may be considered a further object of the invention to provide a seal arrangement which uses the combination of both a plastic seal ring or washer that is filled with molybdenum disulfide, as well as an elongated sleeve-type liner that is fitted around the piston rod opening within the end closure for the fluid motor housing.

Broadly, the present invention provides in connection with a fluid power motor unit having a housing with a cylindrical body portion to accommodate an internal reciprocating piston, at least one piston rod connecting to the piston, and means for introducing fluid pressure to each side of the piston, the improved construction to provide a non-rotating rod and piston, which comprises, providing a polygonal shaped rod as said piston rod, connecting a closure member to one end of said housing having an opening therethrough to pass said piston rod, a seat formed around said opening in said closure member, a seal ring mounted within said seat and having an internal opening sized to provide a slide fit over the exterior of said rod and effect a first stage seal for the latter, a collar member removably connecting to said end closure member and having an elongated tubular guide section shaped to fit over said rod, and a sleeve-form, low coefficient of friction liner within said tubular section of said collar member which will provide a second stage seal around said piston rod.

Preferably, the improved construction will use a hexagon piston rod, however, it is not intended to limit the invention to the use of any one cross-sectional configuration for the rod. In comparison the square rod, the hexagon rod of the same size will weight less per foot and will cost less per pound so that there is an overall approximate savings of 25%. In addition, it may be pointed out that it takes less machining time to turn down and thread the ends of a hexagon rod than it does for a square rod.

The preferred haxagon rod, or other polygonal cross-section, can be obtained as cold drawn stock having rounded corners and, in addition, it has been found that such stock can be sand blasted and coated with molybdenum disulfide to give a long-life and smooth wearing finish, without the need to undergo costly machining and polishing to obtain a low coeflcient of friction.

Again, it is not intended to limit the present invention to the use of any particular material or materials for the seal ring or for the sleeve-liner; however, it has been found that special forms of self-lubricating and wear resistant type materials are of advantage in precluding loss of fluid and a long-life to the assembly. For example, the seal ring may comprise a thermal setting resin impregnated with molybdenum disulfide. Various resin materials such as polyurethane, paraformaldehyde, hexamethylenetetramine, etc., may be used as the resinous material and the molybdenum disulfide may be impregnated into the material by soaking treatments or by compounding it with the particular resin prior to its final formation.

The elongated sleeve member which serves as a bearing or liner through the end closure guide section shall also be formed of a suitable self-lubricating, wear resistant type material so as to assist in effecting a pressure seal for the fluid motor and at the same time permit the cold drawn and coated piston rod to effect a relatively friction-free type of reciprocating motion over long periods of time without causing excessive wear. An inexpensive method of fabrication is preferably utilized in the present assembly through the use of a fiber glass filled Teflon. The latter material is supplied in sheet form so that it may in turn be cut and bent to form a hexagonal form sleeve-form liner. As will be pointed out more fully hereinafter, the advantage of the use of the sheet-form Teflon material resides in being able to cut and form the member so as to have a flange section which can be clamped between two separable portions of the end closure and thus hold the sleeve member in its desired position. The glass fiber-filled Teflon (polytetrafluoroethylene resin) has been found to provide a long life with good wearability; however, it is not intended to limit the present improved assembly to the use of any one sleeve material inasmuch as various plastic form materials, which may or may not have fiber content, may be used to advantage. For example, a suitable wear-resistant sheet resin or plastic which is impregnated with molybdenum disulfide may also serve in lieu of the Teflon or other fluorocarbon, such as fluoronated ethylene-propylene.

Reference to the accompanying drawing and the following description thereof will serve to illustrate one embodiment of the improved construction and arrangement for a double-acting fluid power motor with a non-rotating piston rod arrangement, as well as set forth additional operational advantages which are obtained in connection therewith.

FIG. 1 of the drawing shows in a longitudinal cross-sectional view, a fluid power motor using the combination of a seal ring and an elongated sealing sleeve to effect two stage means for maintaining fluid pressure within the unit.

FIG. 2 shows an elevational view of the seal ring or washer which has a shaped inner opening adapted to provide a close slide fit over a hexagon-shaped piston rod.

FIGS. 3 and 4 show, respectively, an end elevational view and a development of flat sheet material which is utilized to form the elongated sleeve-form seal which encompasses the hexagon-shaped piston rod through the guide portion of the end closure for the fluid motor housing.

Referring now to FIG. 1 of the drawing, there is shown a fluid motor assembly, such as an air operated cylinder, which has a cylindrical body portion 1, an end section 2, with fluid inlet means 3, and an opposing end closure portion 4 with fluid inlet means 5. Thus, there are two air inlet means which provide for the double-action cylinder with pressure supplied each side of the internal piston member 6. In the present embodiment, the piston 6 is shown connected to a hexagon shaped piston rod 7 which extends out through the end closure section 4 and through a clamp-collar member 8 which, in turn, has an elongated hub portion 9. The latter has an internal configuration which conforms to the exterior of piston rod 7 so as to provide a guide for the rod and will preclude its turning during the operation of the fluid motor.

In accordance with the present invention, there are provided, in effect, two stages of seal members around the hexagon shaped piston rod 7 so as to minimize and substantially preclude any fluid leakage outwardly around the piston rod during the motor operation. As a primary seal ring or washer there is provided member 10 which is retained within a seat or notched shoulder portion 11 provided within the exterior face of the end closure section 4. In addition, there is provided an elongated sleeve-liner 12 which has a flange means 13 adapted to be clamped between an interior face of the collar member 8 and the exterior face of seal ring 10. The collar portion 8 is shown to be connected to end section 4 by means of a plurality of bolts or cap screw members 14. The elongated tubular hub and guide section 9 is, of course, internally sized to permit the slip-fit placement therein of the sleeve-liner section 12 and, at the same time, the latter will provide a relatively tight slip-fit over the exterior of the piston rod 7. The flange portion 13 of the sleeve-liner 12, by being clamped tightly in place against the face of the seal ring 10, will preclude the liner from any longitudinal movement end from slipping out through the end of the collar 9.

In accordance with a particular embodiment of this invention, and as best shown in FIGS. 3 and 4 of the drawing, the sleeve-liner member 12 is formed from a flat sheet of a wear-resistant, low coefficient of friction, type of material, such as Teflon impregnated with glass fibers heretofore described. In the developed view of FIG. 4, the member 12 is shown diagrammatically to have a series of partial cuts 15 at one end permitting the formation of six equal tab-like pieces, or "flange" sections 13, when bent at dashed lines 16. At the same time, when the main body portion 12 is bent at each of the dotted lines 17 there will be formed the resulting hexagonally-shaped sleeve-liner 12, as shown in the FIG. 3 elevational view and in the sectional view shown as FIG. 1. The overall size of the sheet material used, as shown in FIG. 4, shall of course be carefully sized so as to provide the resulting properly shaped liner member, of FIGS. 1 and 3, with a tight slip-fit over the piston rod 7 as well as a tight slip-fit within the hexagonal tubular opening of the elongated hub portion 9 of the end collar member 8.

In FIG. 2 of the drawing there is shown an elevational view of the seal ring member 10 with a hexagon shaped opening 18 to provide a slip-fit over the external periphery of the hexagon shaped piston rod 7. As pointed out hereinbefore, the seal ring member 10 is preferably formed of a suitable wear resistant, self-lubricated material, such as polyurethane impregnated with molybdenum disulfide so that there is a minimum of frictional resistance with the piston rod 7. The latter is, of course, also treated with molybdenum disulfide after having been sand blasted or otherwise treated to remove mill-scale or other roughness which may be present when supplied as cold drawn stock. In any event, it has been found unnecessary to effect the machining and polishing of the piston rod member when used in combintion with the present seal means and there is still provided a long life for the assembly with minimum of loss of fluid and pressure through the end closure means.

Also, in a preferred construction, the seal ring 10 may be provided with a continuous recess or groove means 19 which, as shown in FIG. 1, may be placed during assembly to face toward the seat or shoulder portion 11 of end closure section 4. The groove 19 in the ring 10 permits some resilience in the latter so that when it is clamped into place, by pressure from bolts 14 acting on the flange portion of collar 9, there will be some minor deformation of the seal ring 10 to in turn provide a squeezing and sealing against the piston rod 7. In addition, by having the groove 19 face inwardly, there will also be fluid pressure into the grove 19 from the cylinder so as to cause squeezing or expansion of the inner periphery of the seal 10 against the hexagon rod 7.

Although the present drawing illustrates the use of a hexagon shaped rod, which will generally be preferred from economical aspects, it is not intended to limit the present improved seal arrangement in combination with the air cylinder or other form of fluid power motor means to merely the use of a hexagon shaped configuration. In other words, as noted hereinbefore, other polygonal or non-round piston rod means may be utilized to preclude the rotation of the piston rod member during normal operation. An inner seal ring, such as 10, will serve to provide a primary or first stage seal around the reciprocating rod and, at the same time, the elongated sleeve liner, such as 12, which is clamped in place at one end by its flange-like portions 13 will serve to provide an elongated combination slip-fit bearing and second stage seal arrangement which will minimize any fluid leakage from the unit.

Modifications may, of course, be made wtih respect to specific design details in the assembly and still be within the scope of the invention. For example, there may be variations in effecting the clamping of two seal members between the two adjacent sections 4 and 8 of the end closure arrangement. Also, a threaded arrangement between the two sections 4 and 8 of the end closure, or other clamping means may, of course, be used in lieu of a plurality of bolts 14. However, a preferred construction uses a multiple piece end closure means so that the "flange" means or tabs 13 for sleeve liner member 12 may be suitably clamped to hold the latter in a tight longitudinal positioning.

I claim as my invention:

1. In a double-action fluid power motor unit having a housing with a cylindrical body portion to accommodate an internal reciprocating piston, at least one piston rod connecting to the piston, and means for introducing fluid pressure to each side of the piston, the improved construction to provide a non-rotating rod and piston, which comprises, providing a rounded corner hexagonal cross-section rod as said piston rod, attaching a closure member to one end of said housing having an opening therethrough to accommodate said piston rod, a seat formed around said opening in said closure member, a grooved seal ring mounted within said seat that is of lubricant impregnated plastic wherein said lubricant is comprised of molybdenum disulfide and having an internal opening sized to provide a slide fit over the exterior of said rod and effect a first stage seal for the latter, a collar member connecting to said end closure member and having an elongated tubular guide section shaped to fit over said rod, and an elongated hexagonal sleeve-form liner of a fiber reinforced fluorocarbon within said tubular section of said collar member which will provide a second stage seal around said piston rod, with such sleeve-form liner having a length which is a multiple of that of said seal ring and such liner held in position by having flange means extending therefrom and clamped between said collar member and said seal ring in the seat of said closure member.

References Cited

UNITED STATES PATENTS

| | | | |
|---|---|---|---|
| 486,095 | 11/1892 | Elmes | 92—165 |
| 1,836,776 | 12/1931 | Shimer | 92—168 |
| 2,714,331 | 8/1955 | Plante | 92—165 |
| 2,888,879 | 6/1959 | Gaarder | 92—170 XR |
| 2,956,549 | 10/1960 | Malpass | 92—165 |
| 3,069,178 | 12/1962 | Rosen | 277—205 XR |
| 3,131,979 | 5/1964 | Shobert | 308—238 |
| 3,199,831 | 8/1965 | Sully | 277—205 XR |
| 3,279,721 | 10/1966 | Dethman | 308—238 |
| 3,279,806 | 10/1966 | Bialkowski | 277—205 |
| 3,289,649 | 12/1966 | Lamm | 103—216 |
| 3,341,211 | 9/1967 | Houghton et al. | 277—205 |
| 3,376,183 | 4/1968 | Flynn et al. | 308—238 |
| 3,417,664 | 12/1968 | Brucker | 308—238 |
| 3,421,969 | 1/1969 | Roode et al. | 308—238 |

MARTIN P. SCHWADRON, Primary Examiner

L. J. PAYNE, Assistant Examiner

U.S. Cl. X.R.

92—165, 170; 277—205; 303—238